(12) United States Patent
Consolo et al.

(10) Patent No.: US 11,684,230 B2
(45) Date of Patent: *Jun. 27, 2023

(54) MELAMINE FOAM SPONGE CLEANING DEVICES

(71) Applicant: FTI Brands LLC, Upper Arlington, OH (US)

(72) Inventors: Kevin Blaise Consolo, Charlotte, NC (US); Christopher Michael Pavlica, Shadow Hills, CA (US); Nicholas Kirk Wax, Upper Arlington, OH (US)

(73) Assignee: FTI Brands LLC, Upper Arlington, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/549,224

(22) Filed: Dec. 13, 2021

(65) Prior Publication Data

US 2022/0095876 A1 Mar. 31, 2022

Related U.S. Application Data

(63) Continuation of application No. 17/350,472, filed on Jun. 17, 2021, now Pat. No. 11,197,599, which is a continuation of application No. 16/386,971, filed on Apr. 17, 2019, now Pat. No. 11,064,860.

(60) Provisional application No. 62/727,045, filed on Sep. 5, 2018.

(51) Int. Cl.
*A47L 13/16* (2006.01)
*A47L 1/06* (2006.01)
*B32B 27/42* (2006.01)
*B32B 5/24* (2006.01)
*B32B 5/18* (2006.01)

(52) U.S. Cl.
CPC ............... *A47L 13/16* (2013.01); *A47L 1/06* (2013.01); *B32B 5/18* (2013.01); *B32B 5/245* (2013.01); *B32B 27/42* (2013.01); *B32B 2266/0285* (2013.01); *B32B 2266/06* (2013.01)

(58) Field of Classification Search
CPC ............ A47L 1/06; A47L 13/16; B32B 27/42
See application file for complete search history.

(56) References Cited

U.S. PATENT DOCUMENTS

2007/0192978 A1* 8/2007 Michelson ............ A47L 13/146
   15/208
2019/0210076 A1* 7/2019 Omotola ................ B08B 1/005

* cited by examiner

*Primary Examiner* — Michael D Jennings

(57) ABSTRACT

A cleaning device for removing marks from a surface includes a body of melamine foam sponge having a front side and a rear side opposed to the front side, and a holding layer secured to the rear side of the body of melamine foam sponge to prevent relative movement therebetween. The holding layer is preferably a cloth and more preferably natural or synthetic chamois which can be used to wipe and/or buff the surface after rubbing the body of melamine foam sponge on the surface to remove at least one surface mark. The body of melamine foam sponge can be premoistened with a liquid such as a disinfecting solution.

21 Claims, 11 Drawing Sheets

MELAMINE FOAM SPONGE CLEANING DEVICES

CROSS-REFERENCE TO RELATED APPLICATIONS

This application is a continuation application of U.S. patent application Ser. No. 17/350,472 filed on Jun. 17, 2021, now U.S. Pat. No. 11,197,599 issued on Dec. 14, 2021, which is a divisional application of U.S. patent application Ser. No. 16/386,971 filed on Apr. 17, 2019, now U.S. Pat. No. 11,064,860 issued on Jul. 20, 2021, which claims the priority benefit of U.S. Provisional Patent Application No. 62/727,045 filed on Sep. 5, 2018, now expired, the disclosures of which are expressly incorporated herein in their entireties by reference.

STATEMENT REGARDING FEDERALLY SPONSORED RESEARCH

Not applicable

PARTIES TO A JOINT RESEARCH AGREEMENT

Not Applicable

REFERENCE TO APPENDIX

Not applicable

FIELD OF THE INVENTION

The field of the present invention generally relates to cleaning devices, and more particularly, to such devices that comprise melamine foam sponge.

BACKGROUND OF THE INVENTION

Melamine foam sponges have become popular for household cleaning of hard surfaces such as floors, walls, and kitchen and bathroom fixtures. An example of a currently available melamine foam sponge is the Mr. Clean Magic Eraser which is produced by the Proctor & Gamble Company. Such melamine foam sponges have been observed to be effective in the removal of stubborn stains and marks from hard surfaces such as, for example but not limited to, crayon marks on painted wall surfaces or scuff marks from floors.

Currently available melamine foam sponges are sold in a dry form. When used in a dry form, the melamine foam physically abrades the stained or marked hard surface to remove the stain or mark from the hard surface until the stain is at least substantially removed.

Melamine foam sponges, however, can also be used in a hydrated form. To obtain the hydrated form, the user must first wet the melamine foam sponge with water. When hydrated prior to use, it is believed that the melamine foam sponge is physically degraded and small particles break off and abrade the hard surface to remove the stains or marks. This effect is advantageous because the small particles more gently abrade the hard surface to remove the stains or marks without significantly damaging the hard surface which is stained or marked.

While such melamine foam sponges can adequately remove stains and marks from hard surfaces, they tend to break down relatively fast upon use resulting in a relatively short life and difficulty in holding the melamine foam sponges for further use. Accordingly, there continues to be a need for improved melamine foam sponge cleaning devices.

SUMMARY OF THE INVENTION

The present invention provides melamine foam sponge cleaning devices which address at least one of the above-noted problems of the prior art. Disclosed herein is a cleaning device comprising, in combination, a body of melamine foam sponge having a front side and a rear side opposed to the front side, and a holding layer secured to the rear side of the body of melamine foam sponge to prevent relative movement therebetween.

Also disclosed herein is a pre-packaged cleaning system comprising, in combination, a re-sealable air-tight package, and at least one cleaning device located within the re-sealable air-tight package. The at least one cleaning device comprises a body of melamine foam sponge having a front side and a rear side opposed to the front side, and a holding layer secured to the rear side of the body of melamine foam sponge to prevent relative movement therebetween. The body of melamine foam sponge is pre-moistened with a liquid.

Also disclosed herein is a method of cleaning marks off of footwear. The method comprises the steps of obtaining a cleaning device and rubbing a body of melamine foam sponge portion of the cleaning device against the footwear at the marks to remove the marks. The cleaning device comprises a body of melamine foam sponge having a front side and a rear side opposed to the front side, and a holding layer secured to the rear side of the body of melamine foam sponge to prevent relative movement therebetween.

From the foregoing disclosure and the following more detailed description of various preferred embodiments it will be apparent to those skilled in the art that the present invention provides a significant advance in the technology and art of melamine foam sponge cleaning devices. Particularly, significant in this regard is the potential the invention affords for providing a reliable and effective melamine foam sponge that does not rapidly break apart and can be easily held by the user during use to remove stains, marks, and the like. Additional features and advantages of the invention will be better understood in view of the detailed description provided below.

BRIEF DESCRIPTION OF THE DRAWINGS

These and further objects of the invention will become apparent from the following detailed description.

Figure 1:
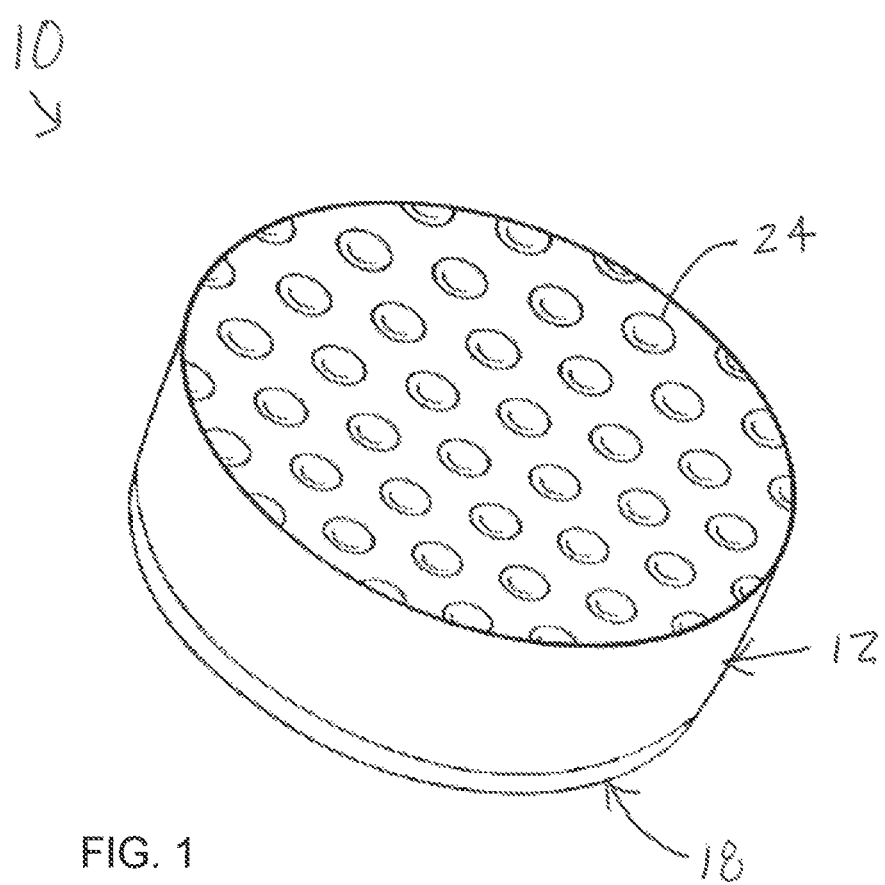
FIG. 1 is a front perspective view of a melamine foam sponge cleaning device according to a first embodiment of the present invention.
Figure 2:
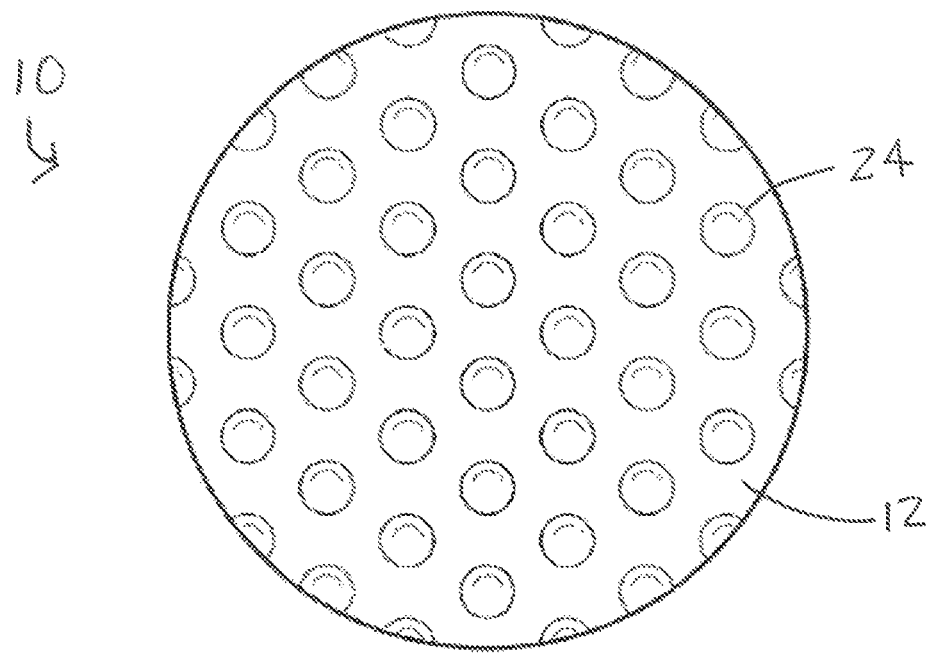
FIG. 2 is a front elevational view of the melamine foam sponge cleaning device of FIG. 1.
Figure 3:
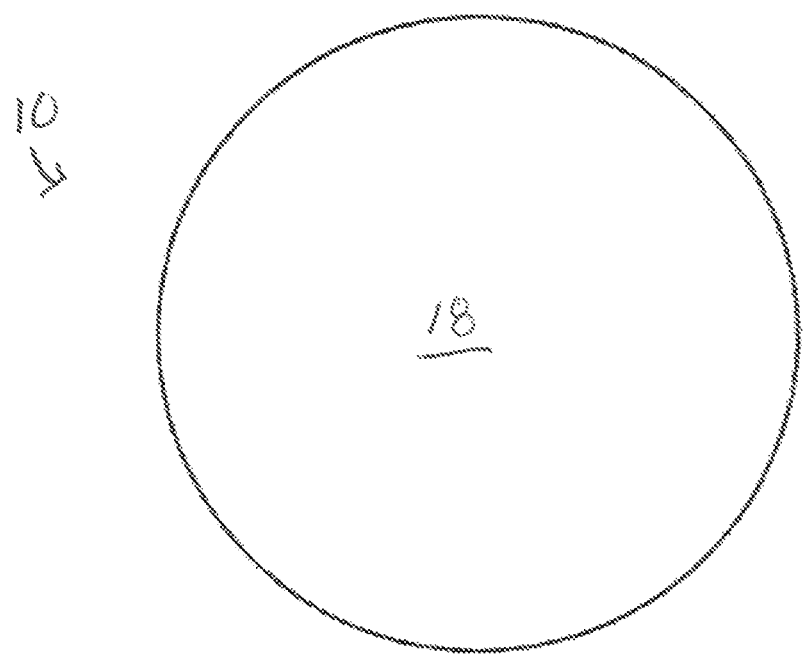
FIG. 3 is a rear elevational view of the melamine foam sponge cleaning device FIGS. 1 and 2.
Figure 4:
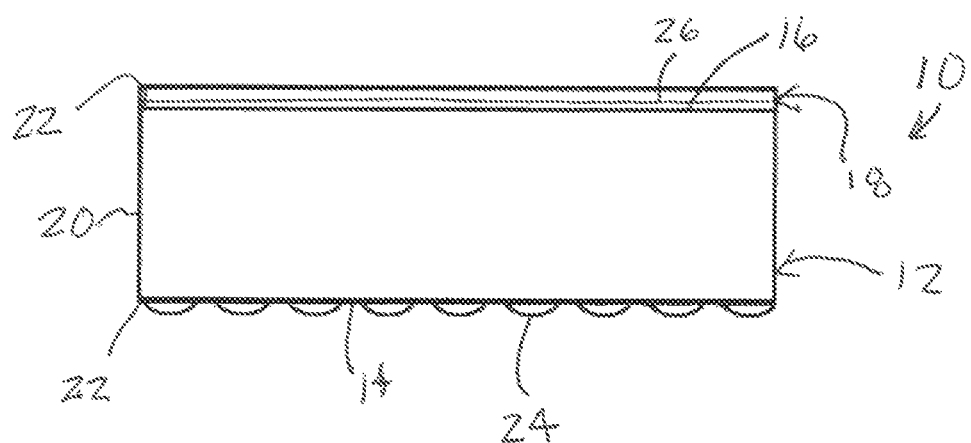
FIG. 4 is a top plan view of the melamine foam sponge cleaning device of FIGS. 1 to 3.
Figure 5:
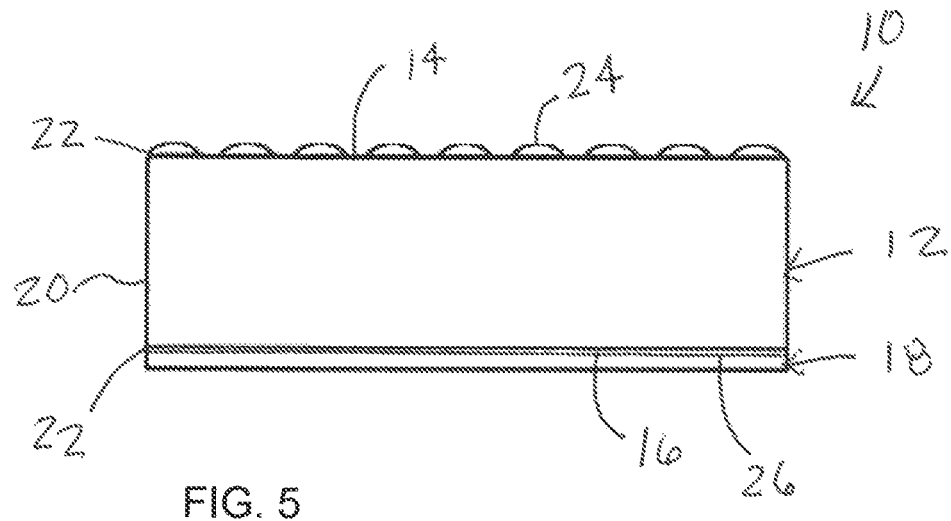
FIG. 5 is a bottom plan view of the melamine foam sponge cleaning device of FIGS. 1 to 4.
Figure 6:
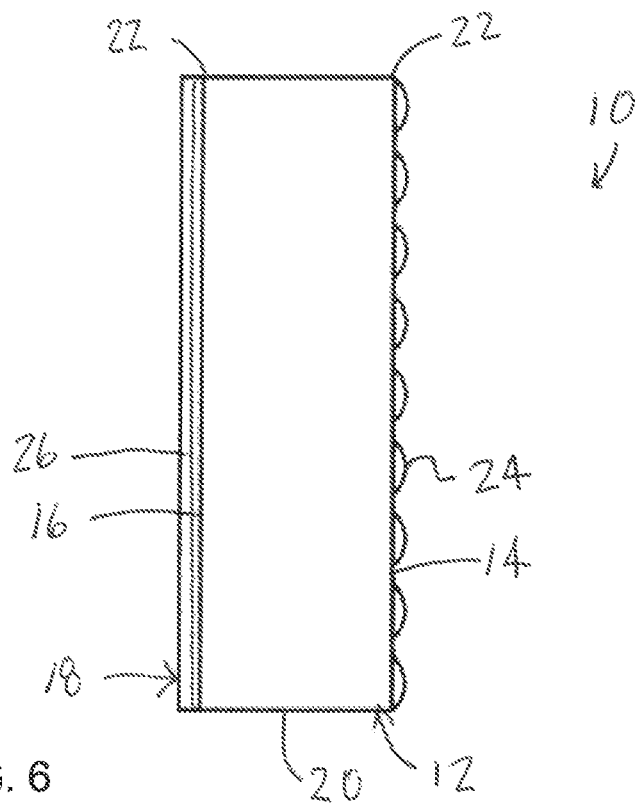
FIG. 6 is a right-side elevational view of the melamine foam sponge cleaning device of FIGS. 1 to 5.
Figure 7:
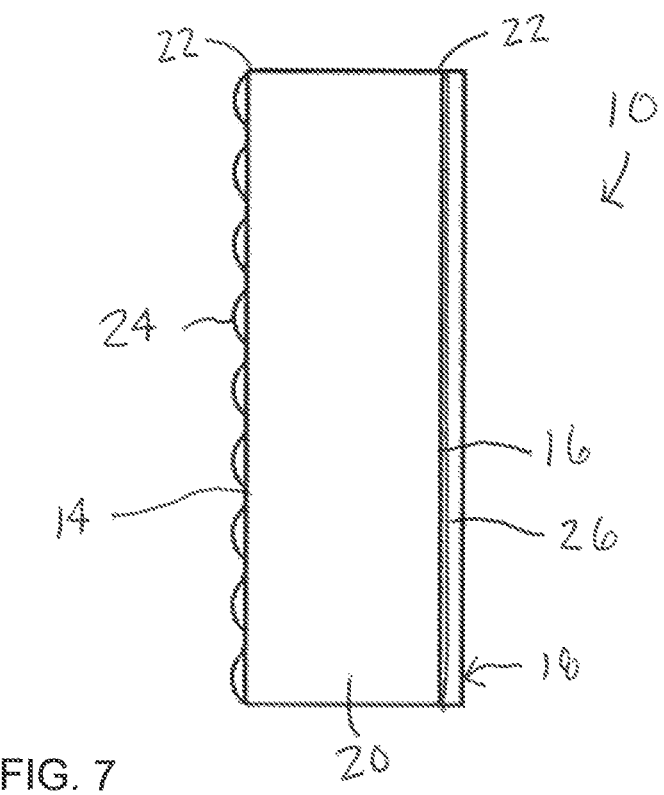
FIG. 7 is a left-side elevational view of the melamine foam sponge cleaning device of FIGS. 1 to 6.
Figure 8:
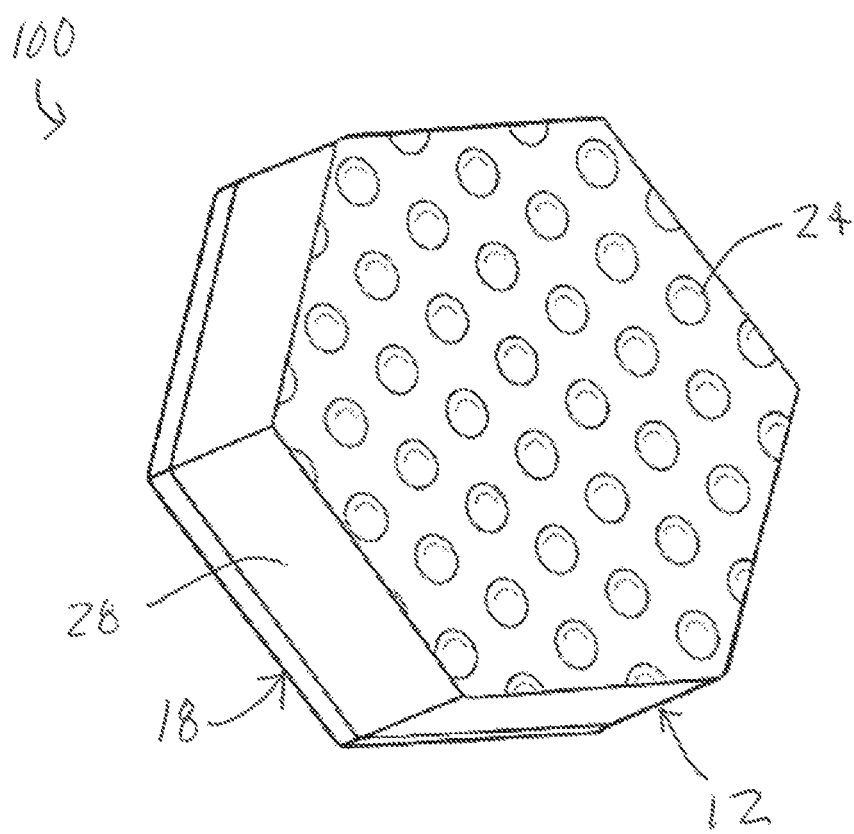
FIG. 8 is a front perspective view of a melamine foam sponge cleaning device according to a second embodiment of the present invention.
Figure 9:
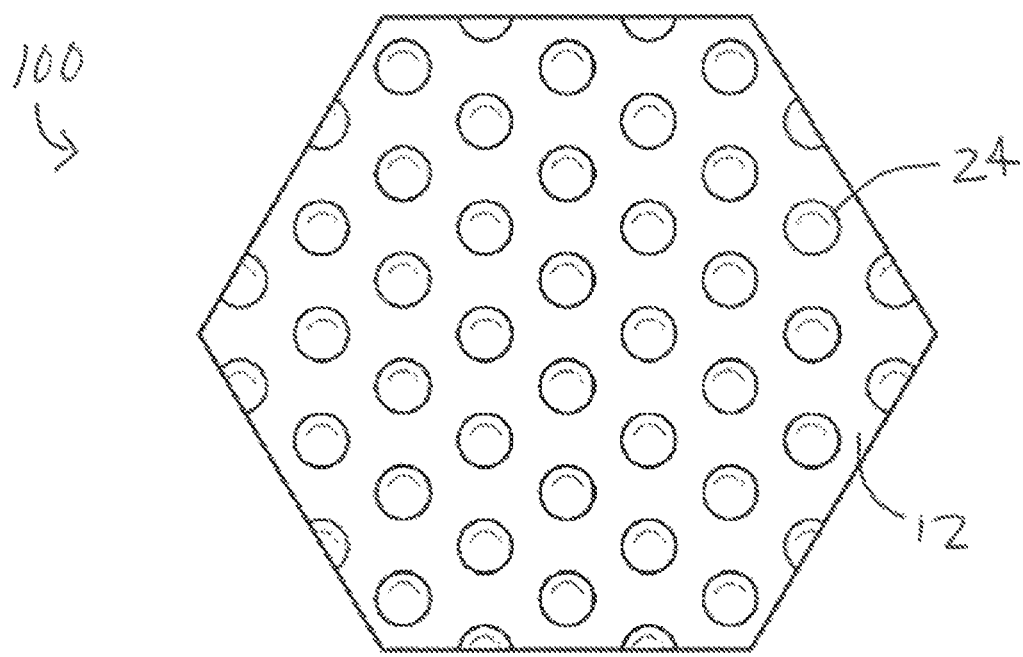
FIG. 9 is a front elevational view of the melamine foam sponge cleaning device of FIG.8.
Figure 10:
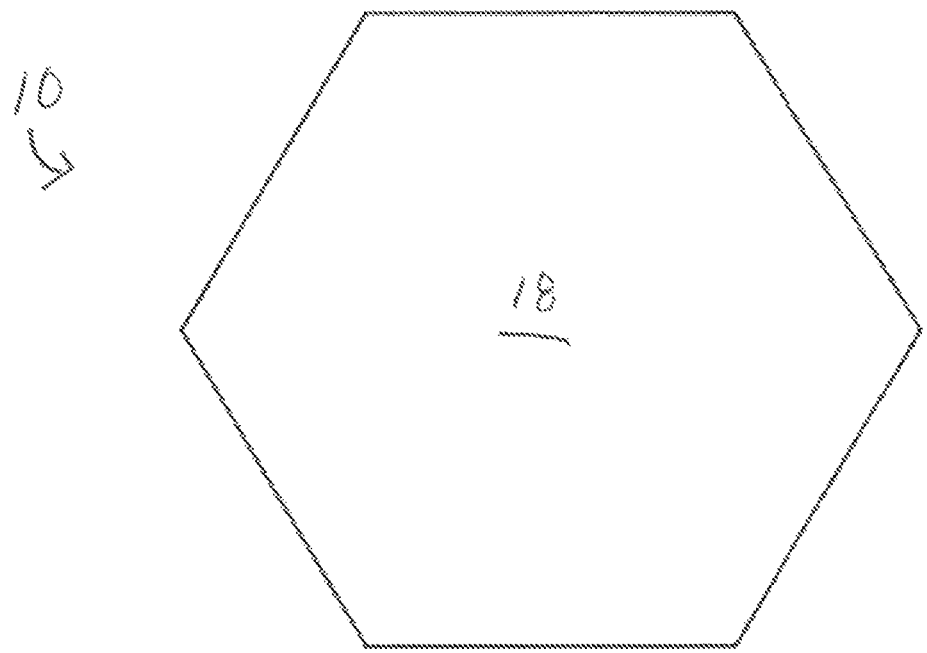
FIG. 10 is a rear elevational view of the melamine foam sponge cleaning device FIGS. 8 and 9.
Figure 11:
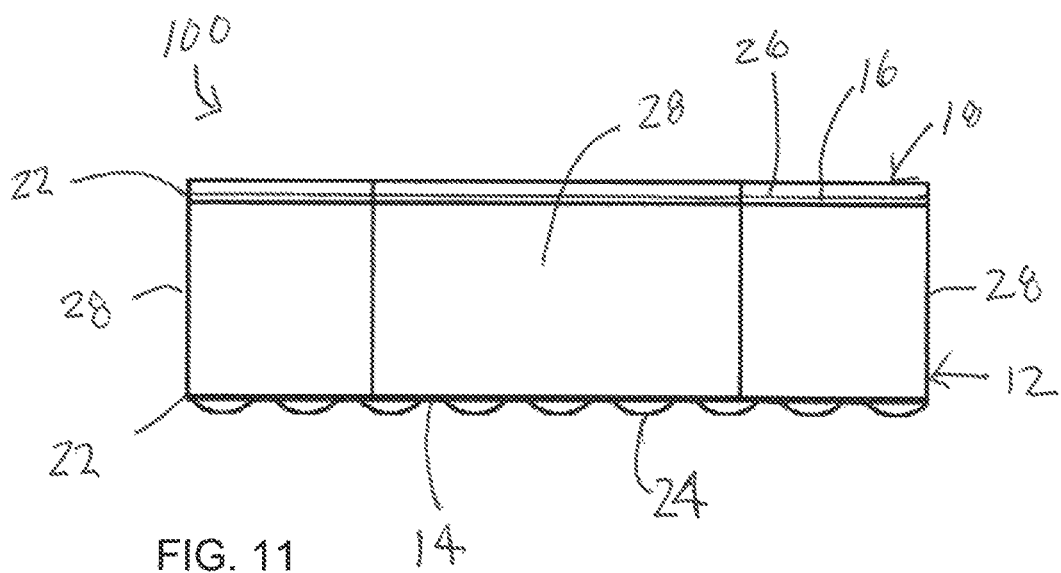
FIG. 11 is a top plan view of the melamine foam sponge cleaning device of FIGS. 8 to 10.
Figure 12:
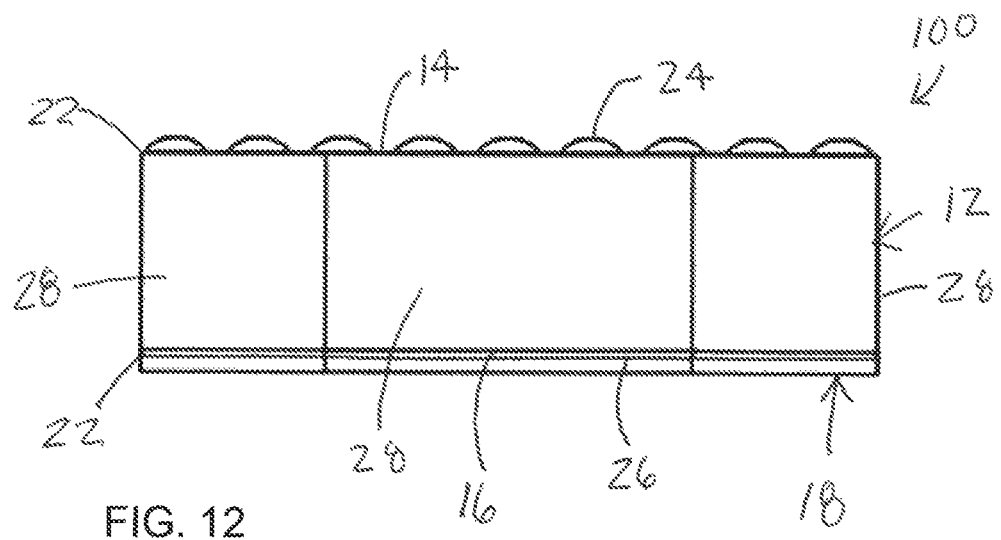
FIG. 12 is a bottom plan view of the melamine foam sponge cleaning device of FIGS. 8 to 11.
Figure 13:
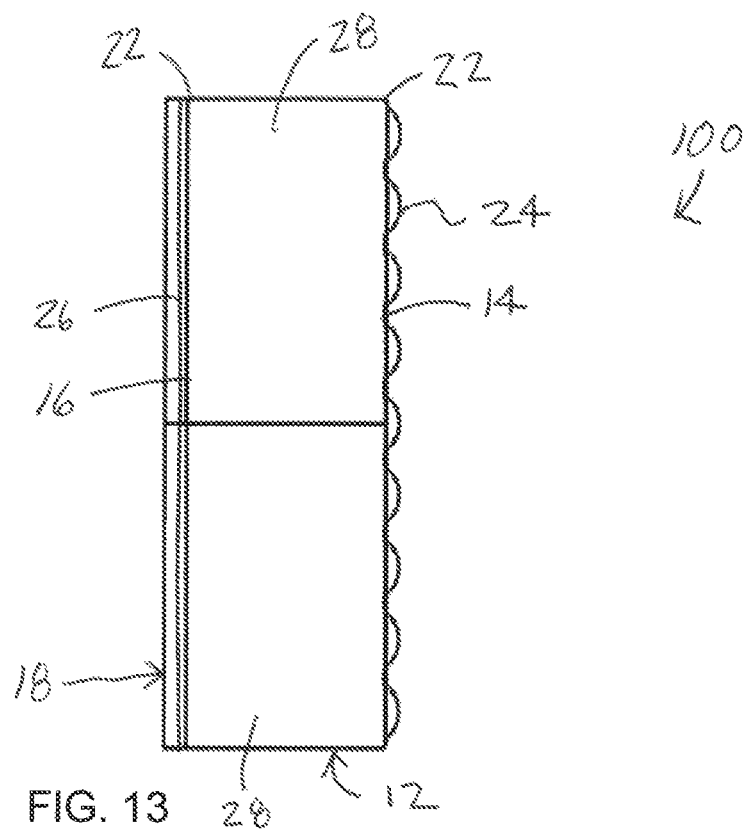
FIG. 13 is a right-side elevational view of the melamine foam sponge cleaning device of FIGS. 8 to 12.
Figure 14:
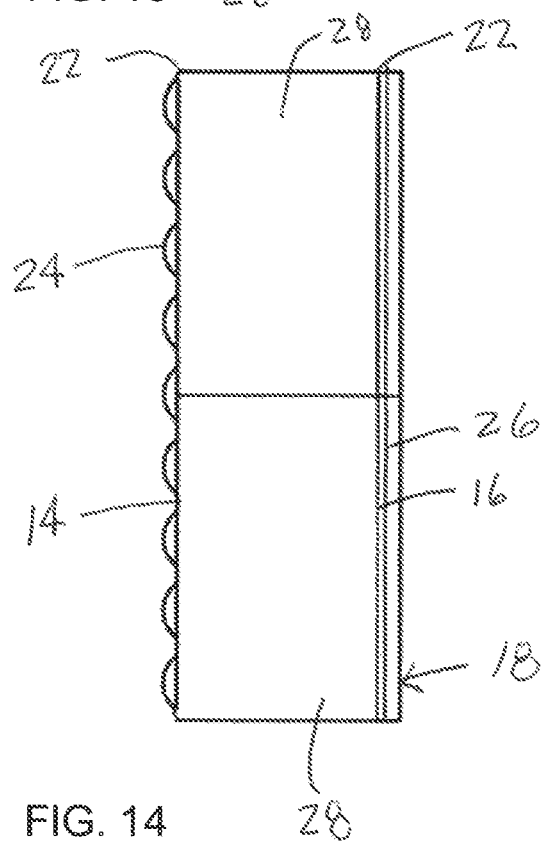
FIG. 14 is a left-side elevational view of the melamine foam sponge cleaning device of FIGS. 8 to 13.

It should be understood that the appended drawings are not necessarily to scale, presenting a somewhat simplified representation of various preferred features illustrative of the basic principles of the invention. The specific design features of the various melamine foam sponge cleaning devices as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the melamine foam sponge cleaning devices illustrated in the drawings. In general, up or upward generally refers to an upward direction within the plane of the paper in FIG. 2 and down or downward generally refers to a downward direction within the plane of the paper in FIG. 2. Also in general, fore or forward generally refers to an outward direction out the plane of the paper in FIG. 2 and aft or rearward generally refers to an inward direction into the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the melamine foam sponge cleaning devices disclosed herein. The following detailed discussion of various alternative and preferred embodiments will illustrate the general principles of the invention with regard to the specific application of melamine foam sponge cleaning devices configured for cleaning footwear. Other embodiments suitable for other applications will be apparent to those skilled in the art given the benefit of this disclosure such as, for example, automotive detailing, marine vessel detailing, sports equipment cleaning, and the like.

FIGS. 1 to 7 illustrate a melamine foam sponge cleaning device 10 according to a first embodiment the present invention. The illustrated melamine foam sponge cleaning device 10 includes a body of melamine foam sponge 12 having a front side 14 and a rear side 16 opposed to the front side 14, and a holding layer 18 secured to the rear side 16 of the body of melamine foam sponge 12 to prevent relative movement therebetween.

The body of melamine foam sponge 12 is sized and shaped for hand-held cleaning or scrubbing. The illustrated body of melamine foam sponge 12 is generally disk or cylindrical shaped having the opposite-facing and spaced-apart front and rear sides or faces 14, 16 connected by a substantially perpendicular sidewall 20 that extends between the front and rear sides 14, 16. The illustrated front and rear sides 14, 16 each have a circular outer periphery to form circular outer edges 22 with the sidewall 20. Thus, the body 12 has a circular-shaped cross-section throughout its thickness. The body of melamine foam sponge 12 preferably has a diameter of about 1.5 inches to about 3.0 inches, and more preferably a diameter of about 2.25 inches. The body of melamine foam sponge 12 preferably has a thickness of about 0.4 inches to about 0.8 inches, and more preferably a thickness of about 0.6 inches. It is noted that the body of melamine foam sponge 12 can alternatively have any other suitable shape and/or size.

The front and rear sides or faces 14, 16 of the body of melamine foam sponge 12 are each generally flat or planar. The front side or face 14 of the body of melamine foam sponge 12 is provided with a plurality of spaced-apart protrusions 24 that extend outward in the forward direction. The illustrated protrusions 24 are generally dome or semi-circular shaped but any other suitable shape can alternatively be utilized.

The body of melamine foam sponge 12 is a foam-like material comprising a formaldehyde-melamine-sodium bisulfite copolymer. The melamine foam sponge is preferably an abradable melamine foam which disintegrates or wears away during use. Suitable melamine foam is marketed as basotect and is available from BASF of Germany but any other suitable melamine foam can be utilized. Melamine foam is an open cell foam that is microporous and extremely hard so that when rubbed on a surface for cleaning it works like extremely fine sandpaper. The foam material is abradable and wears away or disintegrates to leave a residue on the surface that must be removed. When moistened with a liquid, rubbing the foam on a surface can remove otherwise "unremovable" external markings. It is noted that when the surface being cleaned is not of suitable hardness, the surface may be finely scratched by the melamine foam.

The illustrated holding layer 18 is a relatively thin layer of material which covers and is secured to only the rear side or face 16 of the body of melamine foam sponge 12. The illustrated holding layer 18 is circular in shape to closely match the size and shape of the rear side or face 16 of the body of melamine foam sponge 12. The holding layer 18 preferably comprises a material such as, for example but not limited to, cloth which both makes it easier to grasp hold the body of melamine foam sponge 12 with a hand as it wears away by providing a non-wearable and relative slip-resistant resistant surface and assists in holding the body of melamine foam sponge 12 together against crumbling or breaking-apart during use to extend its useful life by providing a tear-resistant surface. The cloth is preferably is natural or synthetic chamois which can also be utilized to buff and/or polish the marked surface after cleaning but can alternatively be any other suitable cloth such as, for example but not limited to, a micro-fiber cloth. The holding layer 18 has a thickness much smaller than the thickness of the body of melamine foam sponge 12 and preferably has a thickness of about 0.05 inches to about 0.15 inches and more preferably about 0.10 inches. It is noted that the holding layer 18 can alternatively have any other suitable material, size, and shape.

The illustrated holding layer 18 is secured to the rear face 16 of the body of melamine foam sponge 12 to prevent relative movement therebetween The illustrated holding layer 18 is secured to the body of melamine foam sponge 12 with a layer of adhesive or glue 26. The adhesive or glue 26 is preferably a non-water soluble adhesive or glue. Any suitable adhesive or glue can be utilized. It is noted that the holding layer 18 can alternatively be secured to the body of melamine foam sponge 12 in any other suitable manner. The body of melamine foam sponge 12 can be pre-moistened with a liquid or can be moistened by the user with a liquid such as, for example, but not limited to, water prior to use. Preferably, the body of melamine foam sponge 12 is pre-moistened with a liquid. Preferably the body of melamine foam sponge 12 is pre-moistened with a disinfectant solution. The disinfectant solution can comprise water and denatured alcohol. It is noted that any other disinfectant solution or other liquid can be utilized to pre-moisten the body of melamine foam sponge 12.

FIGS. 8 to 14 illustrate a melamine foam sponge cleaning device 100 according to a second embodiment of the invention. The melamine foam sponge cleaning device 100 according to the second embodiment of the invention is substantially the same as the melamine foam sponge cleaning device 10 according to the first embodiment of the invention described hereinabove except for the shape. The melamine foam sponge cleaning device 100 according to the second embodiment of the invention has polygonal peripheral shape with at least five sides rather than a circular peripheral shape. The polygonal shape provides five or more adjacent sidewalls 28 forming corners 30 therebetween. The corners 30 can assist to clean cracks, crevices, and the like on the item to be cleaned. Having five or more sidewalls 28 enables the melamine foam sponge cleaning device 100 to have the corners 30 while still having a near circular shape that can be more easily grasped by the user's hand. The illustrated melamine foam sponge cleaning device 100 has six sidewalls 30 to form a hexagon shape.

Figure 15:
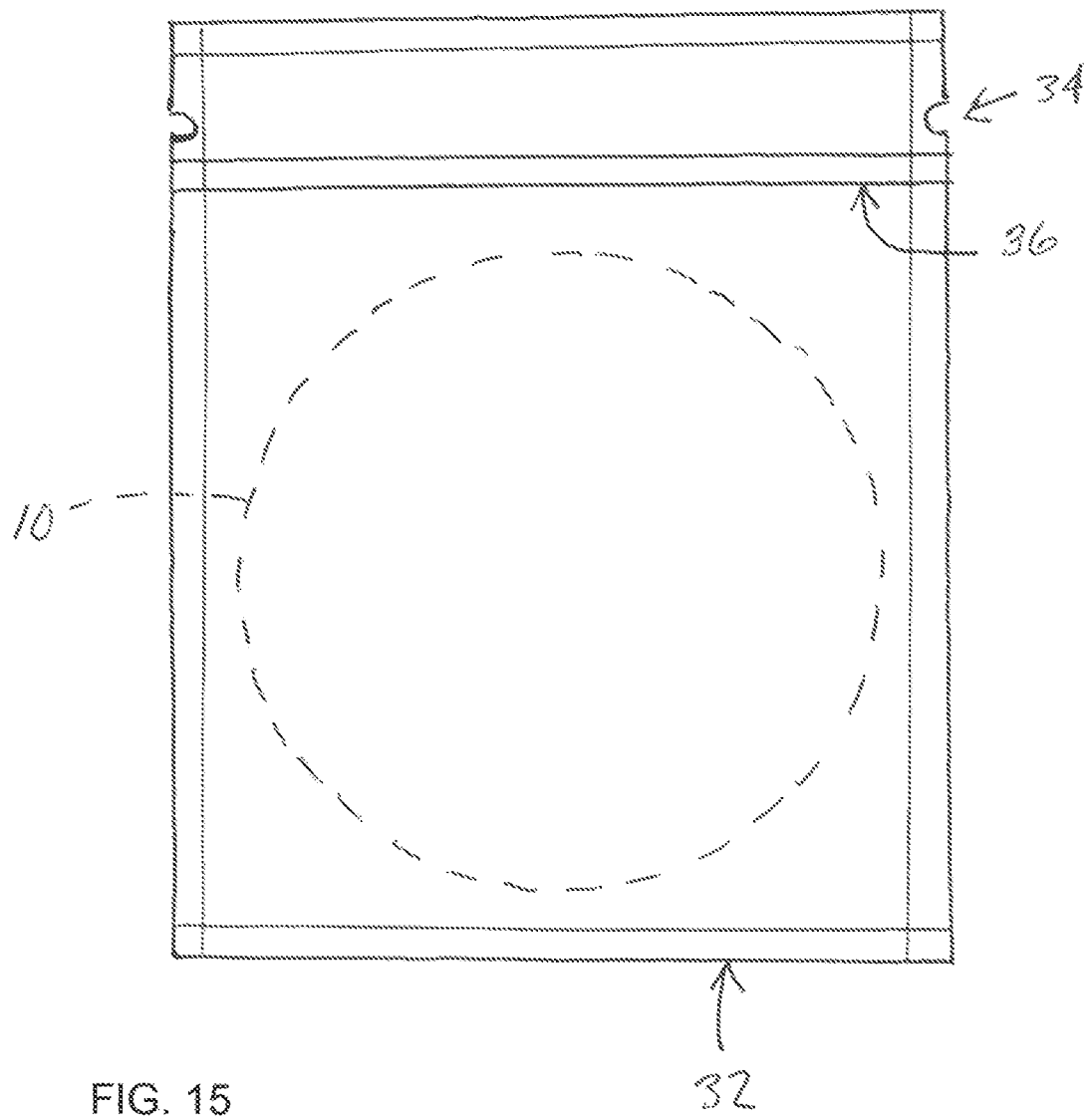
FIGS. 15 is a diagrammatic view an air-tight sealed package containing a melamine foam sponge cleaning device of FIGS. 1 to 7 which has been pre-moistened with a liquid.

FIG. 15 illustrates an air-tight sealed package 32 containing a single pre-moistened melamine foam sponge cleaning device 10, 100 according to the invention. The illustrated package 32 is an opaque rectangular-shaped pouch but any other suitable configuration can be utilized. The illustrated air-tight sealed package 32 includes a tear line 34 located outside a re-closable seal 36 so that once the package 32 is torn open it can be resealed with the re-closable seal 36 to maintain an air-tight seal. Thus, the melamine foam sponge cleaning device 10, 100 can be provided pre-moistened in the package 32 for its first use and then re-sealed in the air-tight sealed package 32 with the re-closable seal 36 for subsequent uses to maintain the pre-moistened condition of the cleaning device 10, 100. It is noted that the package 32 can alternatively have any other suitable configuration.

Figure 16:
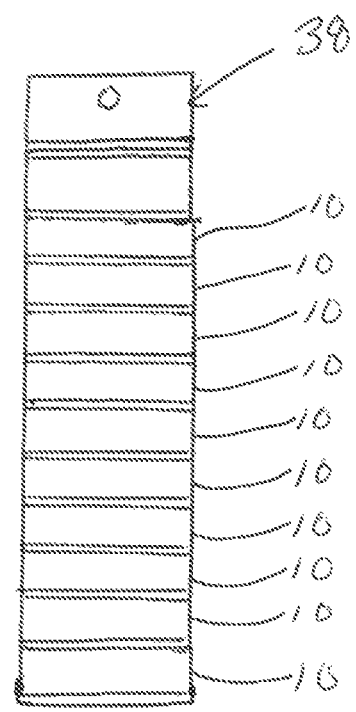
FIG. 16 is a diagrammatic view a sealed package containing a plurality of the melamine foam sponge cleaning devices of FIGS. 1 to 7.

FIG. 16 illustrates a package 38 containing a plurality of melamine foam sponge cleaning devices 10, 100 according to the invention that are dry or not pre-moistened. The illustrated package 38 has a tube or sleeve shape that closely receives a stack of ten of the melamine foam sponge cleaning devices 10, 100. It is noted that the package can alternatively have any other suitable configuration.

Figure 17:
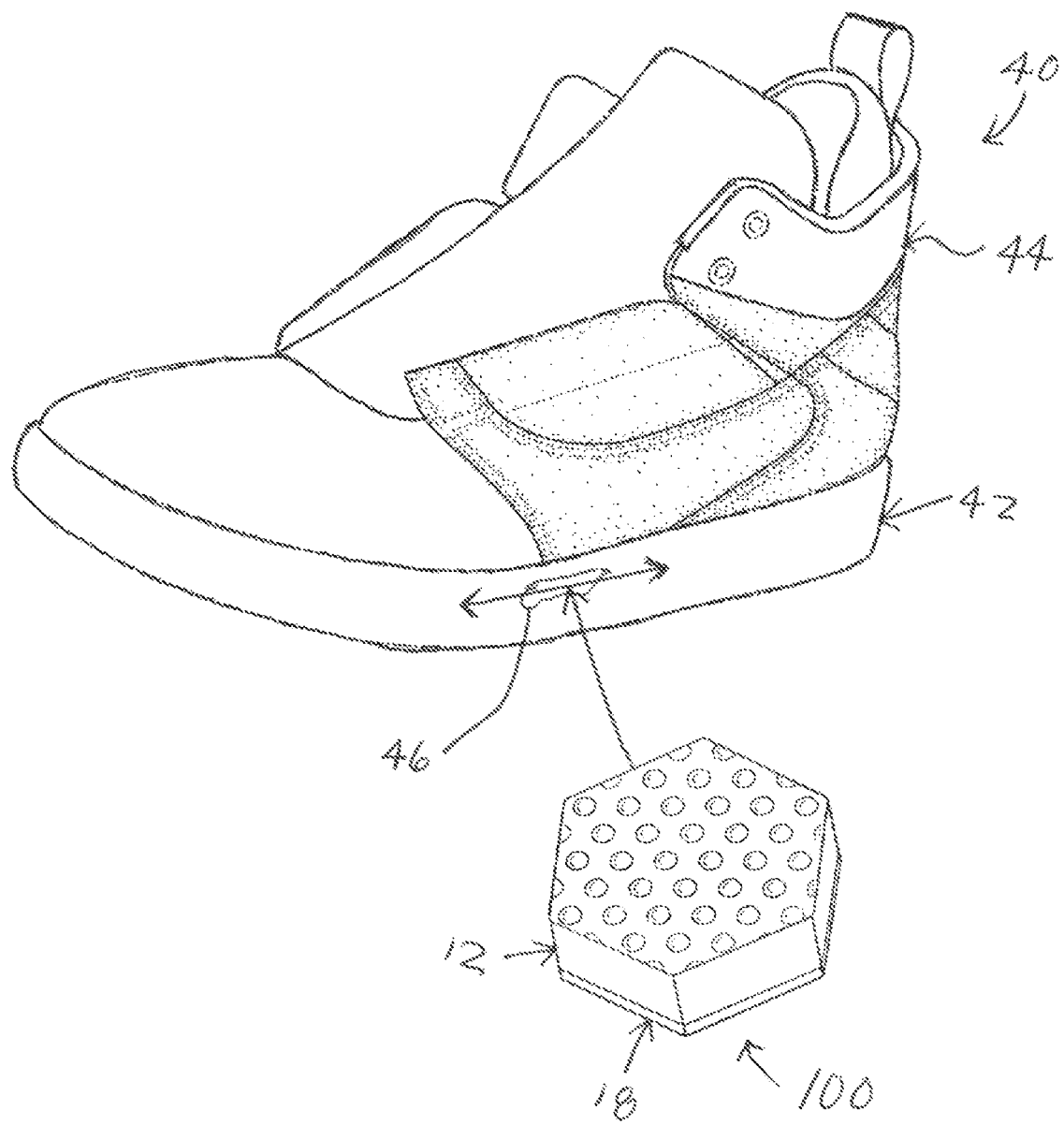
FIG. 17 is a diagrammatic view of the melamine foam sponge cleaning device of FIGS. 8 to 14 being used to remove marks from an outsole of footwear.

The melamine foam sponge cleaning devices 10, 100 described above can be advantageously utilized to clean marks from footwear 40. Footwear 40 typically has an outsole 42 that supports the bottom of the user's foot and an upper 44 that extends upward from the outsole 42 to cover the user's foot (best shown in FIG. 17). The footwear can also have one or more midsoles locate between the outsole 42 and the upper 44 to provide additional cushioning. The outsole 42 (and any midsoles) of athletic-type footwear 40 is typically formed of relatively soft materials such as, for example but not limited to, natural or synthetic rubber, a combination of natural and synthetic rubber, polyurethane, ethyl vinyl acetate (EVA), polyvinyl chloride (PVC), combinations thereof, and the like. Because these materials can be relatively soft, they tend to be easily inadvertently marked-up during use. In order to remove these surface marks 46, the user must first remove the melamine foam sponge cleaning device 10, 100 from its package 32, 38 unless it has been previously removed. If the melamine foam sponge cleaning device 10, 100 is not pre-moistened, the user should first moisten the melamine foam sponge cleaning devices 10, 100 with a desired liquid. The user then grasps the melamine foam sponge cleaning device 10, 100 in a hand and rubs the front face 14 and/or sidewall 20 of the melamine foam sponge cleaning device 10, 100 onto a surface of the footwear 40 such as the outsole 42 having any surface marks 46 that are desired to be removed until the surface marks 46 are removed from the footwear 40. When the holding layer 18 is a cloth, the user can then rub the surface where the surface marks 46 were removed with the holding layer 18 to remove any residue left there on. When the holding layer 18 is natural or synthetic chamois or the like, the user can then buff or polish the cleaned surface where the surface marks 46 were removed with the natural or synthetic chamois holding layer 18 to reduce or remove any fine scratches that may be present on the surface of the footwear 40 where the surface marks 46 were removed. This process can be repeated whenever there is an undesired surface mark 46 on the footwear 40.

It is noted that each of the features of the various disclosed embodiments of the present invention can be utilized in any combination with each of the other disclosed embodiments of the present invention.

From the above disclosure it can be appreciated that the melamine foam sponge cleaning devices according to the present invention can be easily held and do not easily and quickly crumble during use.

The preferred embodiments of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention.

What is claimed is:

1. A pre-packaged cleaning system comprising, in combination:
   a package;
   at least one cleaning device located within the package;
   wherein the at least one cleaning device comprises:
   a body of microporous foam sponge having a front side and a rear side opposed to the front side; and
   a holding layer secured to the rear side of the body of micro-porous foam sponge.

2. The pre-packaged cleaning system of claim 1, wherein the holding layer comprises cloth.

3. The pre-packaged cleaning system of claim 2, wherein the cloth is natural or synthetic chamois.

4. The pre-packaged cleaning system of claim 1, wherein the holding layer is secured to the body of microporous foam sponge with adhesive.

5. The pre-packaged cleaning system of claim 1, wherein the body of microporous foam sponge is pre-moistened with a liquid.

6. The pre-packaged cleaning system of claim 5, wherein the liquid is a disinfectant solution.

7. The pre-packaged cleaning system of claim 6, wherein the disinfectant solution comprises water and denatured alcohol.

8. The pre-packaged cleaning system of claim 1, wherein the body of microporous foam sponge has a circular shaped outer periphery.

9. The prepackaged cleaning system of claim 8, wherein the body of microporous foam sponge is provided with a plurality of spaced-apart dome-shaped protrusions that extend outward from the front side.

10. The pre-packaged cleaning system of claim 1, wherein the body of microporous foam sponge has a polygonal shaped outer periphery with at least five sides.

11. The prepackaged cleaning system of claim 10, wherein the body of microporous foam sponge is provided with a plurality of spaced-apart dome-shaped protrusions that extend outward from the front side.

12. The prepackaged cleaning system of claim 1, wherein the body of microporous foam sponge is provided with a plurality of spaced-apart protrusions that extend outward from the front side.

13. The pre-packaged cleaning system of claim 12, wherein each of the plurality of spaced-apart protrusions is dome-shaped.

14. The pre-packaged cleaning system of claim 1, wherein the body of microporous foam sponge is an open cell melamine foam sponge.

15. The pre-packaged cleaning system of claim 1, wherein the package is an air-tight package.

16. The pre-packaged cleaning system of claim 15, wherein the air-tight package is resealable.

17. The pre-packaged cleaning system of claim 1, wherein the package is resealable.

18. The pre-packaged cleaning system of claim 1, wherein the package contains only one of the cleaning device.

19. The pre-packaged cleaning system of claim 18, wherein the package is a rectangular-shaped pouch.

20. The pre-packaged cleaning system of claim 1, wherein the package contains a plurality of the cleaning device.

21. The pre-packaged cleaning system of claim 20, wherein the package is a tube containing a stack of the plurality of the cleaning device.

\* \* \* \* \*